United States Patent
Zhang et al.

(10) Patent No.: US 12,050,684 B2
(45) Date of Patent: Jul. 30, 2024

(54) DETECTING MALWARE CAMPAIGNS BASED ON ANALYSIS OF COMPOSITE TIME SERIES OF TELEMETRY DATA

(71) Applicant: VMware, Inc., Palo Alto, CA (US)

(72) Inventors: Jason Zhang, Oxford (GB); Stefano Ortolani, Twickenham (GB); Giovanni Vigna, Santa Barbara, CA (US)

(73) Assignee: VMware, Inc., Palo Alto, CA (US)

( * ) Notice: Subject to any disclaimer, the term of this patent is extended or adjusted under 35 U.S.C. 154(b) by 734 days.

(21) Appl. No.: 17/239,511

(22) Filed: Apr. 23, 2021

(65) Prior Publication Data

US 2022/0342990 A1    Oct. 27, 2022

(51) Int. Cl.
*G06F 21/56* (2013.01)

(52) U.S. Cl.
CPC ...... *G06F 21/562* (2013.01); *G06F 2221/033* (2013.01)

(58) Field of Classification Search
CPC .......... G06F 21/562; G06F 21/554; G06F 2221/033; H04L 63/1458; H04L 63/1408; H04L 63/1416
See application file for complete search history.

(56) References Cited

U.S. PATENT DOCUMENTS 8,046,637 B2 * 10/2011 Gross ................. G06F 11/0724 714/37
2006/0047807 A1 * 3/2006 Magnaghi ........... H04L 63/1458 709/224

OTHER PUBLICATIONS

Zhang, J. et al., "Phorpiex-powered bitransomware targets APAC universities", Dec. 2020, https:/ / blogs . vmware . com / networkvirtualization / 2020 / 12 /phorpiex-powered-bitransomware-targets-apac-universities.html., capture Feb. 5, 2021, 9 pages.
B. Singh. 2020. Evolution of excel 4.0 macro weaponization—part 2. (Oct. 2020). https://blogs.vmware.com/networkvirtualization/2020/10/evolution- of- excel- 4- 0-macro-weaponization-continued.html., captured Feb. 5, 2021, 12 pages.
J. Zhang and S. Ortolani. 2020. VelvetSweatshop: default passwords can still make a difference. (Dec. 2020). https:/ / blogs . vmware . com / networkvirtualization / 2020 / 11 /velvetsweatshop-when-default-passwords-can-still-makea-difference.html/., captured Feb. 5, 2021, 10 pages.

(Continued)

*Primary Examiner* — Paul E Callahan
(74) *Attorney, Agent, or Firm* — King Intellectual Asset Management

(57) ABSTRACT

The disclosure herein describes the detection of malware campaigns based on analysis of attributes of telemetry data. Telemetry data associated with malware campaign detection includes multiple attributes and is associated with a first time interval. Statistics of a target statistic set are calculated based on a composite time series of the multiple attributes of the telemetry data. The target set is compared to a historical statistic set based on a second time interval and, based on the target set exceeding a statistic threshold of the historical set, peak detection analysis of the target set is performed. Based on the analysis indicating the presence of a valid peak result, a notification of detection of a malware campaign is sent, wherein the notification includes data indicative of the valid peak result and enables a receiver of the notification to take corrective action.

20 Claims, 8 Drawing Sheets

(56) References Cited

OTHER PUBLICATIONS

Accenture. 2019. Ninth annual cost of cybercrime study.(Mar. 2019). https://www.accenture.com/us-en/insights/security/cost-cybercrime-study., captured Feb. 5, 2021, 6 pages.
IBM. 2019. IBM study shows data breach costs on the rise; financial impact felt for years. (Jul. 2019). https://newsroom.ibm.com/2019-07-23-IBM-Study-Shows-Data-Breach-Costs-on-the-Rise-Financial-Impact-Felt-for-Years., captured Feb. 5, 2021, 5 pages.
WHO. 2020. WHO reports fivefold increase in cyber attacks, urges vigilance. (Apr. 2020). https://www.who.int/news/item/23-04-2020-who-reports-fivefold-increase-in-cyberattacks-urges-vigilance., captured Feb. 5, 2021, 2 pages.
The Hill. 2020. FBI sees spike in cyber crime reports during coronavirus pandemic. (Apr. 2020). https://thehill.com/ policy / cybersecurity / 493198 - fbi - sees - spike - in - cyber - crime-reports-during-coronavirus-pandemic., captured Feb. 5, 2021, 2 pages.
S. Sarkar, J. Zhang, and S. Ortolani. 2020. Infostealersweaponizing covid-19. (May 2020). https://www.lastline.com/labsblog/infostealers-weaponizing-covid-19/., captured Feb. 5, 2021, 16 pages.
J. Zhang, S. Sarkar, and S. Ortolani. 2020. COVID-19 cyberthreats and malware updates. (Nov. 2020). https://blogs.vmware.com/networkvirtualization/2020/11/covid-19-cyberthreat-and-malware-updates.html/., captured Feb. 5, 2021, 10 pages.
V.T. Jordanov, D.L Hall, and M. Kastner. 2002. Digital peak detector with noise threshold. In Proceedings of IEEE Nuclear Science Symposium Conference. vol. 1, 140-142.
K. Harmer, G. Howells, W. Sheng, M. Fairhurst, and F. Deravi. 2008. A peak-trough detection algorithm based on momentum. In Proceedings of the International Congress on Image and Signal Processing). vol. 4. (May 2008), 454-458.
I. Azzini, R. Dell'Anna, F. Ciocchetta, F. Demichelis, A. Sboner, E. Blanzieri, and A. Malossini. 2004. Simple methods for peak detection in time series microarray data. In Proceedings of CAMDA'04 (Critical Assessment of Microarray Data)., http://camda2009.bioinformatics.northwestern.edu/camda04/papers/days/thursday/azzini/paper.pdf, captured Feb. 5, 2021, 5 pages.
Q. Qin, J. Li, Y. Yue, and C. Liu. 2017. An adaptive and timeefficient ECG R-Peak detection algorithm. Journal of Healthcare Engineering, (Sep. 2017)., https://downloads.hindawi.com/journals/jhe/2017/5980541.pdf, captured Feb. 5, 2021, 15 pages.
J. Park, S. Lee, and U. Park. 2017. R peak detection method using wavelet transform and modified shannon energy envelope. Journal of Healthcare Engineering, (Jul. 2017)., https://downloads.hindawi.com/journals/jhe/2017/4901017.pdf, captured Feb. 5, 2021, 15 pages.
Y. Zhu and D. Shasha. 2003. Efficient elastic burst detection in data streams. In Proceedings of the ninth ACM SIGKDD international conference on Knowledge discovery and data mining). vol. 1, https://cs.nyu.edu/cs/faculty/shasha/papers/burst.d/burst.pdf, captured Feb. 5, 2021, 336-345.
M. Ma1, A. van Genderen1, and P. Beukelman. 2005. Developing and implementing peak detection for real-time image registration. In Proceedings of Annual Workshop on Circuits, Systems and Signal Processing). vol. 1, http://ce-publications.et.tudelft.nl/publications/877_developing_and_implementing_peak_detection_for_realtime_ima.pdf, captured Feb. 5, 2021, 641-652.
P. Healy, G. Hunt, S. Kilroy, T. Lynn, J. P. Morrison, and S. Venkatagiri. 2015. Evaluation of peak detection algorithms for social media event detection. In Proceedings of 2015 10th International Workshop on Semantic and Social Media Adaptation and Personalization (SMAP), 1-9, https://www.researchgate.net/publication/283569789_Evaluation_of_Peak_Detection_Algorithms_for_Social_Media_Event_Detection, captured Feb. 5, 2021, 9 pages.

J. Pan and W. J. Tompkins. 1985. A real time qrs detection algorithm. IEEE Transactions on Biomedical Engineering, 32, 3, (Mar. 1985), https://www.robots.ox.ac.uk/~gari/teaching/cdt/A3/readings/ECG/Pan+Tompkins.pdf, captured Feb. 8, 2021, 230-236.
R. Gutierrez-Rivas, J. J. García, W. P. Marnane, and Á. Hernández. 2015. Novel real-time low-complexity qrs complex detector based on adaptive thresholding. IEEE Sensors Journal, 15, 10, (Jun. 2015), 6036-6043.
D. Clifton, P. S. Addison, M. K. Stiles, and I. R. Legarreta. 2003. Using wavelet transform reassignment techniques for ecg characterization. In Proceedings of 30th Annual Meeting on Computers in Cardiology). vol. 30, 581-584, https://www.researchgate.net/publication/4071535_Using_wavelet_transform_reassignment_techniques_for_ECG_characterisation, captured Feb. 8, 2021, 5 pages.
D. Benitez, P.A. Gaydecki abd A. Zaidi, and A.P. Fitzpatrick. 2001. The use of the hilbert transform in ecg signal analysis. Computers in Biology and Medicine, 31, 5, 399-406.
Q. Xue, Y.H. Hu, and W.J. Tompkins. 1992. Neural-networkbased adaptive matched filtering for qrs detection. IEEE Transactions on Biomedical Engineering, 39, 4, (Apr. 1992), https://www.researchgate.net/publication/21564128_IEEE_neural-network-based_adaptive_matched_filtering_for_QRS_detection, captured Feb. 9, 2021, 317-329.
G. Vijaya, V. Kumar, and H.K. Verma. 1998. Ann-based qrscomplex analysis of ecg. Journal of Medical Engineering & Technology, 22, 4, (Aug. 1998), 160-167.
B. Shim, H. Min, and S. Yoon. 2009. Nonlinear preprocessing method for detecting peaks from gas chromatograms. BMC Bioinformatics, 378, (Nov. 2009), https://www.researchgate.net/publication/38098372_Nonlinear_preprocessing_method_for_detecting_peaks_from_gas_chromatograms, captured Feb. 9, 2021, 11 pages.
A.T. Tzallas, V.P. Oikonomou, and D.I. Fotiadis. 2006. Epileptic spike detection using a kalman filter based approach. In Proceedings of the 28th IEEE EMBS Annual International Conference). (Sep. 2006), https://www.matlabi.ir/wp-content/uploads/bank_papers/g_paper/g310_www.matlabi.ir_Epileptic%20Spike%20Detection%20Using%20a%20Kalman%20Filter%20Based%20Approach.pdf, captured Feb. 9, 2021, 501-504.
N. Nguyen, H. Huang, S. Oraintara, and A. Vo. 2009. Peak detection in mass spectrometry by gabor filters and envelope analysis. Journal of Bioinformatics and Computational Biology, 7, 3, (Jul. 2009), 547-569.
M.J. Fredriksson, P. Petersson, B.O. Axelsson, and D. Bylund. 2009. An automatic peak finding method for lc-ms data using gaussian second derivative filtering. Journal of Separation Science, 32, 22, (Nov. 2009), https://onlinelibrary.wiley.com/doi/epdf/10.1002/jssc.200900395, captured Feb. 9, 2021, 3906-3918.
L. Invernizzi, S. Miskovic, R. Torres, C. Kruegel, S. Saha, G. Vigna, S. Lee, and M. Mellia. 2014. Nazca: detecting malware distribution in large-scale networks. In Proceedings of Network and Distributed System Security Symposium). (Feb. 2014), https://www.ndss-symposium.org/wp-content/uploads/2017/09/11_1_1.pdf, captured Feb. 9, 2021, 16 pages.
R. Nair, C. P. Kasula, S. Vankayala, and N. Chakraborty. 2019. Ip network anomaly detection using machine learning. In Proceedings of 5th International Conference for Convergence in Technology). doi: 10.1109/I2CT45611, https://www.researchgate.net/publication/332411234_IP_Network_Anomaly_Detection_using_Machine_Learning, captured Feb. 9, 2021, 8 pages.
Das, K. et al., "Searching through composite time series", https://www.ml.cmu.edu/research/dap-papers/das_kdd2.pdf, downloaded Apr. 12, 2021, 8 pages.

* cited by examiner

DETECTING MALWARE CAMPAIGNS BASED ON ANALYSIS OF COMPOSITE TIME SERIES OF TELEMETRY DATA

BACKGROUND

Cybersecurity threats have been growing significantly in both volume and sophistication over the past decade. This has also been accompanied by an increasing collection of threat telemetry data, ranging from sandbox analysis timelines to intrusion detection/prevention systems data, just to name a few. Telemetry data, typically represented by an enriched time series, can be analyzed to identify a number of informative events: occurrences of malware campaigns, encounter rates for specific malware delivery vectors, commonly affected verticals, and even anomalies revealing the presence of false positives. While the telemetry data holds tremendous value, mining such data sets is expensive and complex. As a result, organizations often fail to gain further insights of the underlying threat landscape even though they have access to telemetry data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure enable and enhance the detection of malware campaigns at least by receiving, by a processor, telemetry data associated with malware campaign detection, wherein the telemetry data includes data entries associated with a first time interval; calculating, by the processor, a target statistic set based on a composite time series of the received telemetry data; comparing, by the processor, the target statistic set to a historical statistic set, wherein the historical statistic set is based on a second time interval that is a greater length than the first time interval and the second time interval precedes the first time interval; based on comparison of the target statistic set to the historical statistic set indicating that a statistic value associated with the target statistic set exceeds a statistic threshold of the historical statistic set, performing, by the processor, peak detection analysis on the target statistic set; and based on the peak detection analysis indicating that a valid peak result is in the received telemetry data, sending, by the processor, a notification of detection of a malware campaign, wherein the notification includes data indicative of the valid peak result and enables a receiver of the notification to take corrective action.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 8, the systems are illustrated as schematic drawings. The drawings may not be to scale.

DETAILED DESCRIPTION

Figure 1:
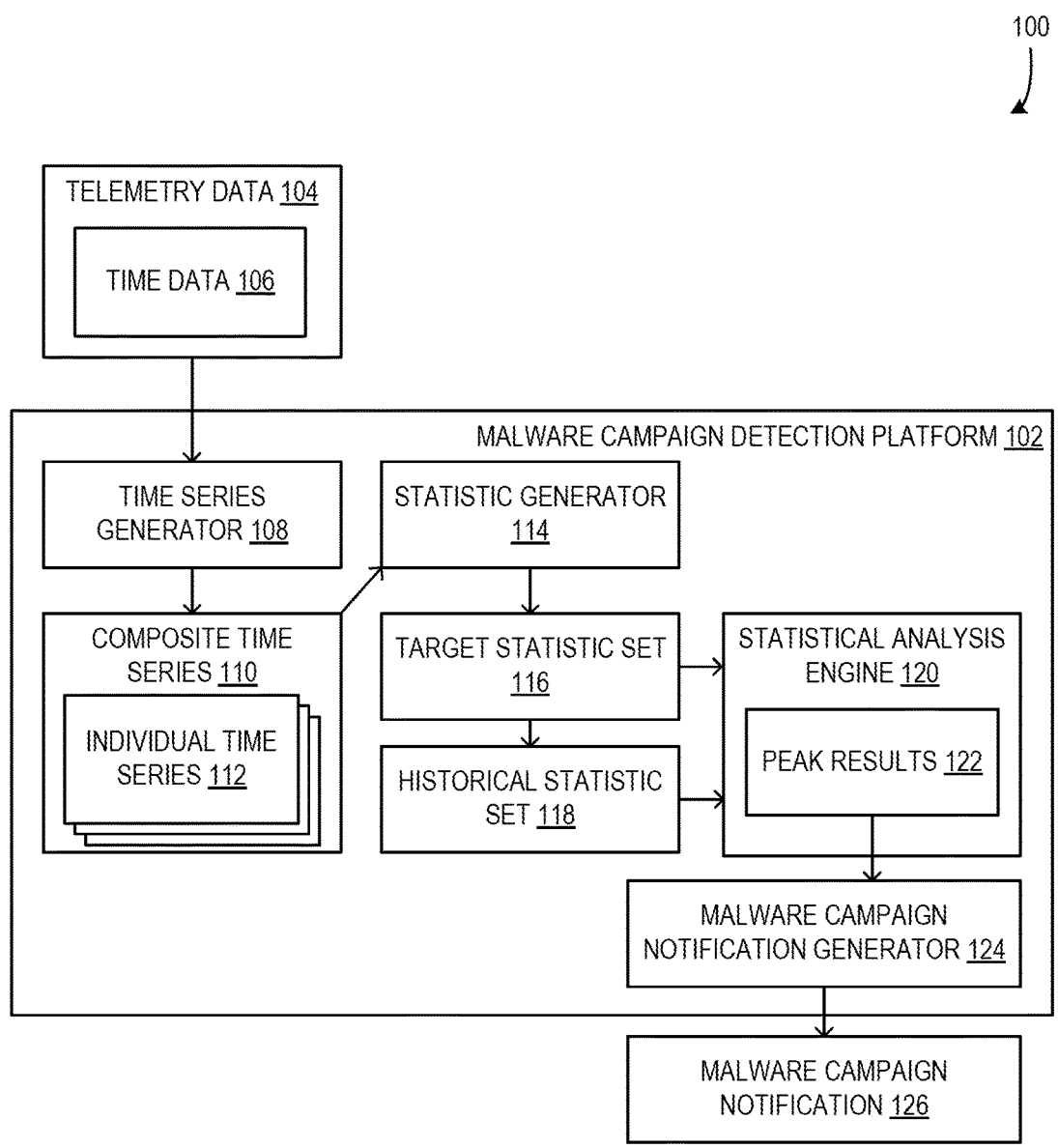
FIG. 1 is a block diagram illustrating a system including a platform configured to detect malware campaigns based on analysis of composite time series data.

Detecting malware campaigns and providing associated notifications, based on the analysis of composite time series of telemetry data, are described. The described systems and methods include a mechanism to detect malware campaigns (e.g., a series, group, or wave of detections, attacks, or other events associated with malicious activity) and associated events as they occur by relying on telemetry data in an efficient and scalable manner. More specifically, the present disclosure computes a set of statistics over two different sliding time windows or intervals: a target time window and a historical time window. At least by adopting two different levels of granularity, changes in the target telemetry data that are not reflected in the historical telemetry data are tracked, thus identifying anomalies that translate into "peaks". The analysis of the telemetry data is performed on composite time series of data, enabling the analysis of relationships between multiple attributes of computing system operations that are accurately indicative of malware campaigns.

The described method and system enable the detection of valid peak results in target telemetry data and the sending of notifications associated therewith to receivers, enabling the receivers to respond to detected malware campaigns with corrective action. In some examples, telemetry data is received that is associated with malware campaign detection, wherein the data includes multiple attributes and is associated with a first time interval. Statistics of a target statistic set are calculated based on composite time series of the telemetry data. The target set is compared to a historical statistic set based on a second time interval and, based on the target set exceeding a statistical threshold of the historical set, peak detection analysis of the target set is performed. Based on the analysis indicating the presence of a valid peak result, a notification of detection of a malware campaign is sent, wherein the notification includes data indicative of the valid peak result.

While the examples herein are primarily directed to detection of malware campaigns, peak detection plays an important role in time series analysis and signal processing across many different applications. Some of the existing applications include signal processing, bioinformatics, electrocardiogram analysis, astrophysics, image processing, and social media event detection. Throughout these various domains, finding peaks is the process of identifying meaningful anomalies or outliers in a given time series, with the aim of differentiating legitimate or valid peaks based on other signals, such as noise and baseline changes. Ideally, a peak detector should be able to find all relevant peaks (depending on the domain) and ignore all the irrelevant ones.

This requirement has led to many past approaches, including thresholding, wavelet transforms, Hilbert transforms, artificial neural networks, momentum, and various other filtering methods (nonlinear, Kalman, Garbor, and Gaussian). Most of these methods are designed to be domain-specific, meaning they are generally restricted to a specific set of applications. This is because each application has its own time series characterized by a different set of underlying features, noise levels, and baselines, thus requiring specific optimization to achieve sufficient accuracy. In the domain of malware campaign detection, malware threat telemetry data is often defined over multiple attributes, making it challenging to adapt the above-mentioned existing approaches. For example, a timeline of file detections contains information related to the detection time, the specific malware detected, and the file type. Likewise, a timeline of network alerts can contain the time of a detection, but also codependent information such as the threat being detected and the contextual impact of that threat. However, current literature does not offer approaches specifically designed to perform peak detection on threat telemetry data to detect malware campaigns. For example, existing systems focus on event detection rather than campaign detection. In contrast, the disclosure enables the analysis of multiple attributes over multiple time windows to provide accurate, efficient peak detection and, as a result, identification of such malware campaigns.

The disclosure is configured to track and analyze multiple attributes that may be indicative of malware campaigns alone or in combination with other attributes. The use of multiple attributes reduces the occurrence of false peaks being identified and increases the accuracy with which valid peaks are identified. Additionally, the disclosure operates in an unconventional manner by analyzing data from a target time window and data from a historical time window to further reduce false positives, thus enabling the described systems and methods to analyze the attributes at multiple levels of granularity. An apparent peak in data in a shorter target time window may be revealed to be a normal operating pattern when compared to the data in a longer or otherwise different historical time window. The telemetry data analysis described herein identifies peak signals that correspond to a number of informative events: occurrences of malware campaigns, most-used malware delivery vectors, commonly affected verticals, sources and techniques used to deliver spam campaigns, or the like. The disclosure provides efficient processing of time series data through the combination of past target statistic sets into the historical statistic sets without fully recalculating the statistics of the historical statistic set. Further, the use of a dynamically updated, or rolling, historical statistic set and associated historical time window enables the disclosure to handle shifts in normal operation of computing systems over time with little or no manual intervention to reconfigure the system. The disclosure enables improved performance of processing resources during peak detection by halting processing associated with false positive peaks early based on target statistic data failing to meet or exceed defined historical thresholds. Additionally, systems that are monitored and notified by the described malware campaign detection systems and methods are enabled to respond to malware campaigns quickly and efficiently with corrective action, enhancing the potential performance of such systems over time.

FIG. 1 is a block diagram illustrating a system 100 including a platform 102 configured to detect malware campaigns based on analysis of composite time series data 110 according to an embodiment. In some examples, the malware campaign detection platform 102 is a computing system that receives, obtains, or otherwise has access to telemetry data 104 associated with time data 106 (e.g., a time interval), and performs analysis operations thereon to identify peak results 122 based on statistics of the telemetry data 104. Example analysis operations performed by the malware campaign detection platform 102 include transforming the telemetry data 104 into a composite time series 110 (e.g., comprising multiple individual time series 112), generating a target statistic set 116 from the composite time series 110, and analyzing the target statistic set 116 and a related historical statistic set 118 for peaks therein which are related to malware campaigns and/or events. In some examples, as a result of identifying one or more peak result 122, a malware campaign notification generator 124 generates a malware campaign notification 126 indicative of the identified peak results.

In some examples, the malware campaign detection platform 102 is stored on and/or executed on a single computing device. Alternatively, in other examples, some or all of the malware campaign detection platform 102 is stored on and/or executed on a network of distributed computing devices connected via one or more computer networks (e.g., a cloud computing network). Within such a network, the distributed computing devices are configured to perform the described operations on individual computing devices within the network or the distributed computing devices are configured to share the performance of such operations (e.g., parallelizing an operation across multiple computing devices). The malware campaign detection platform 102 may be stored on and/or performed on more, fewer, or a different organization of computing devices without departing from the description herein.

The telemetry data 104 received or otherwise obtained by the malware campaign detection platform 102 is from one or more other computing systems or networks on which the malware campaign detection platform 102 is configured to detect malware campaigns or events. In some examples, the telemetry data 104 is from a single computing device, while in other examples, the telemetry data 104 is from a plurality of computing devices (e.g., a customer or client's computer network).

In some examples, the telemetry data 104 is associated with events that have occurred on one or more computing devices and/or attributes of the operations of those computing devices. The telemetry data 104 is associated with the time data 106 which, in some examples, describe the range of time during which the events described by the telemetry data 104 occurred (e.g., the telemetry data 104 is data associated with the 24-hour time interval of Apr. 1, 2021, such that all the events described in the telemetry data 104 occurred during Apr. 1, 2021). In such examples, the telemetry data 104 is received in a batch that includes data associated with some or all the events that occurred on the source computing system(s) during the time interval defined by the time data 106. The malware campaign detection platform 102 is configured to receive or otherwise obtain such telemetry data batches at a regular interval, based on the occurrence of defined events, based on instructions from another entity, or the like. The time data 106 is included as an interval with which the entire batch of telemetry data 104 is associated and/or as timestamps or similar indicators for each of the described event or attribute data entries in the telemetry data (e.g., a data entry that includes an indicator describing an event that occurred and a timestamp indicating at what time the event occurred).

In other examples, the telemetry data 104 is received or otherwise obtained by the malware campaign detection platform 102 in a stream of data rather than a batch. In such examples, the telemetry data 104 arrives at the malware campaign detection platform 102 in a regular or irregular pattern and, in many cases, in smaller sets of data entries than in the batch examples described above. For instance, the malware campaign detection platform 102 is configured to receive telemetry data entries 104 in real time or near real time, such that telemetry data entries associated with events on a computing system arrive at the malware campaign detection platform 102 as they occur, or shortly thereafter. In such a configuration, the time data 106 is included with each data entry and/or set of data entries received (e.g., data entries with timestamps as described herein).

It should be understood that the telemetry data 104 may be received and/or obtained according to other configurations without departing from the description herein. For instance, telemetry data entries are associated with count values or other markers that indicate a relative order of the data entries without indicating specific time information. Other configurations, arrangements, or organizations may also be used.

In some examples, the telemetry data 104 includes data entries that describe the occurrence of events and/or other attributes of computing system operations that may be indicative of the presence and/or operation of one or more malware programs or applications therein. For instance, a malware program or set of programs is known to access a particular type of file or a specific file on a computing system in a particular manner. A data collection application is also be active on the computing system being monitored that is configured to collect telemetry data and provide it to the malware campaign detection platform 102. In such examples, the data collection application is configured to collect telemetry data associated with instances of programs accessing or attempting to access the particular file type and/or the particular file. Each access attempt is collected by the data collection application as a telemetry data entry and each telemetry data entry is associated with a timestamp or other marker upon being collected. Other events or attributes of operation of a computing system that may be associated with malware operations may be included in the telemetry data 104 without departing from the description. For instance, these events include access attempts of files or memory associated with core functionality of the computing system, identifiers and/or hashes of files accessed, instantiation of threads and/or processes by applications, or the like.

The time series generator 108 is configured to receive the telemetry data 104 as input and to produce a composite time series 110 therefrom. In some examples, the time series generator 108 is configured to divide the telemetry data 104 into sets of data entries associated with attributes (e.g., a set of data entries associated with attempts to access a defined file type) and those sets of data entries are arranged into individual time series 112. An individual time series 112, or composing time series, includes a plurality of data entries, including time data 106 associated therewith, arranged in order based on their time data 106 (e.g., data entries arranged from oldest to newest according to associated timestamps). Each individual time series 112 is identified or otherwise associated with an attribute (e.g., a type of artifact, such as portable document file (PDF) or MICROSOFT Excel file types), and the events within a individual time series 112 are associated with one or more other attributes (e.g., a file hash of an observed sample). It should be understood that each individual time series 112 may be associated with multiple data attributes (e.g., each individual time series 112 may be a multi-attribute time series). The time series generator 108 is configured to perform these operations on data associated with multiple attributes, such that a plurality of individual time series 112 are generated, and then the plurality of individual time series 112 are combined into a composite time series 110.

The attribute data included in the composite time series 110 is based on the types of events, attributes, or operation patterns that are most likely to be indicative of malware campaign operations on the source computing system(s). For instance, if a malware campaign can be reliably identified based on operations that access a particular type of file and that access specific files of that type in a particular manner or pattern, a composite time series 110 is generated from telemetry data 104 that is, at least in part, associated with access events of the file type and access events of specific files of that type (e.g., based on file hashes of those files). The resulting composite time series 110 is then analyzed to identify where events associated with those two attributes (the file type access events and the file hash access events) coincide or otherwise interact to identify likely malware activity. Analysis of the composite time series 110 may include analysis of one or more individual time series 112 associated with the file type access event and the file hash access event attributes. In some examples, the telemetry data 104 includes a "verdict" attribute which may be a "malicious" data value or a "benign" data value, wherein the "malicious" data value indicates that data (e.g., data of a detected peak result) is associated with a malware campaign. The operations of the malware campaign detection platform 102 may be primarily concerned with data associated with a "malicious" verdict attribute, but data associated with "benign" verdict attributes may be used for other purposes without departing from the description. In other examples, more and/or different types of attributes may be included in the attribute data of the composite time series 110.

Further, in some examples, the composite time series 110 is associated with a defined time interval or time window (e.g., a target time window 230, as described below with respect to FIG. 2), such that all data entries in the composite time series 110 are within that time interval. Additionally, the composite time series 110 is configured to include all data entries associated with relevant events (e.g., events associated with at least one of the multiple attributes of the time series 110) that occurred during the time interval, such that no more data entries are expected to be received for that time interval. As a result, the generated composite time series 110 is considered a complete set of relevant data entries by the malware campaign detection platform 102 prior to being provided to the statistic generator 114 for processing as described below.

In other examples, the telemetry data 104 is received or otherwise obtained by the malware campaign detection platform 102 in the format of a composite time series 110, such that the operations of the time series generator 108 are unnecessary.

In some examples, composite time series 110 and the associated event data represent different concepts depending on the domain of the data to be analyzed. For instance, in the case of malware campaign detection as described herein, a possible individual time series is the file detection timeline of a particular file type, which is identified by the attribute "file type", such as portable document file (PDF) type files. In this context, the events described by the data in the time series refer to related malicious file detections. These detections may be identified by another attribute, such as the file hash of the file being detected. Hence, a peak detected as described herein in this context has two attributes: the file type and the file hash. It is worth noting that a file could be detected multiple times, such that a file hash can be associated with multiple detection events.

The statistic generator 114 is configured to receive the individual time series 112 of the composite time series 110 and generate a target statistic set 116 based thereon. The target statistic set 116 may include statistics for each individual time series 112 such that the statistics of each time series 112 can be analyzed separately as described herein. For instance, the statistic generator 114 is configured to generate statistics about instances of one or more of the attribute events in a time series 112, total event counts of a first attribute per an occurrence of a second attribute, a mean event count of a first attribute per an occurrence of a second attribute, a standard deviation of event counts of a first attribute per occurrence of a second attribute, an event count of the most prevalent occurrence of a second attribute (e.g., the number of detections of access to a file type associated with the file hash seen the most often in the file hash events), and/or the like. In other examples, more, fewer, or different types of statistics may be generated from the time series 110 without departing from the description. Further, the statistic generator 114 may be configured to generate the target statistic set 116 to include statistics for all of the individual time series 112 at one time or the statistic generator 114 may be configured to generate target statistic sets 116 for each individual time series 112 separately, such that the statistical analysis engine 120 is enabled to analyze each target statistic set 116 of each individual time series 112 in series as they are generated.

In some examples, the target statistic set 116 represents the pattern of occurrence of events associated with the attributes to be analyzed within the time window of the current time series 110. The attributes and statistics are configured such that a "peak" in that pattern is very likely to be indicative of a malware campaign and/or events associated with the malware campaign. Such a peak may represent a combination of event occurrences that is outside of the normal operation of the computing device as a result of the presence of such a malware campaign. The statistical analysis engine 120 is configured to identify such peaks in the target statistic set 116 as identified peak results 122, but the statistical analysis engine 120 is also configured to analyze the target statistic set 116 with respect to a historical statistic set 118, which is maintained by the malware campaign detection platform 102 over time.

Figure 2:
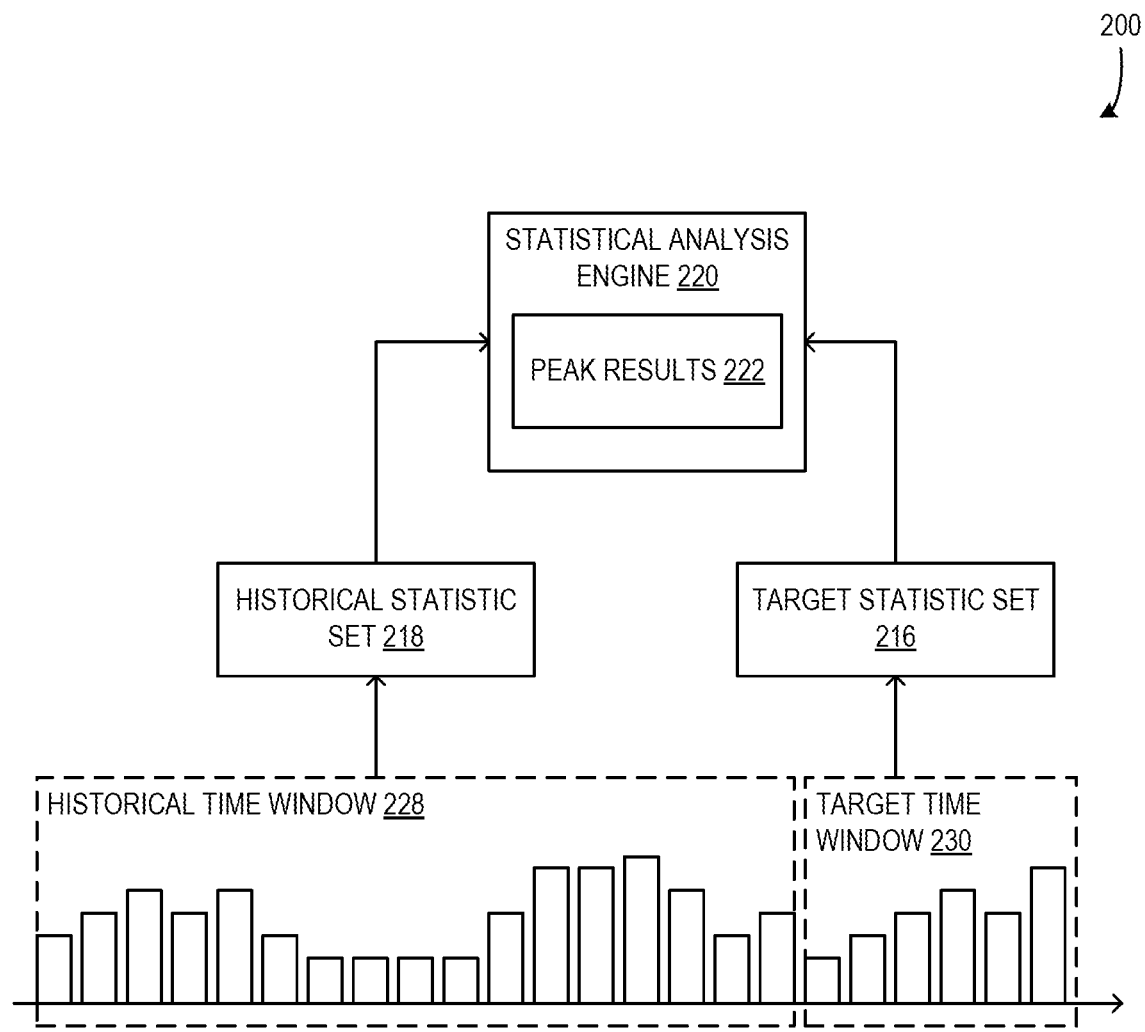
FIG. 2 is a diagram illustrating analysis of time series data in a target time window and a historical time window.

The historical statistic set 118 includes similar or the same statistics as the target statistic set 116, but they are based on a different time window (e.g., the historical time window 228 as described with respect to FIG. 2). Analysis of the target statistic set 116 enables the identification of peaks or other anomalies in the data of the current time series 110, but only relative to the data of the time window associated therewith. As a result, peaks identified in data of a particular time window may not actually be outliers or statistical abnormalities over a longer or different period of time. To avoid such false positive results, the malware campaign detection platform 102 maintains the historical statistic set 118 and analyzes the target statistic set 116 with respect to the historical statistics of the set 118. Further, in examples where the target statistic set 116 includes separate statistic sets based on each individual time series 112, the historical statistic set 118 similarly includes separate statistic sets based on each individual time series 112. As a result, the statistical analysis engine 120 is enabled to analyze statistic sets for each individual time series 112 in a series or in another processing order as described herein.

In some examples, maintaining the historical statistic set 118 further includes "rolling" it forward for each target statistic set 116 that is analyzed. After the analysis of the target statistic set 116 is complete, the statistics of the set 116 are incorporated into the statistics of the historical attribute statistics set 118. This process is described in greater detail below with respect to FIG. 3. In such examples, the historical statistic set 118 is configured to include a plurality of previous target statistic sets as subsets, and statistics of the set 118 are calculated based on the combination of those previously used subsets (e.g., a count of subsets in the set 118, a global mean of event counts per subset, a global maximum mean of event counts per attribute in the subsets, or the like, where "global" indicates statistics based on all data in the associated historical time window or interval).

In some examples, the statistical analysis engine 120 is configured to analyze the target statistic set 116 and the historical statistic set 118 to identify peak results 122 in the target statistic set 116 (e.g., a target statistic set 116 based on an individual time series 112) and confirm that those peak results 122 are not false positive with respect to the historical statistic set 118. The analysis performed by the statistical analysis engine 120 includes comparing statistics of the target statistic set 116 to one or more thresholds that are determined based on the historical statistic set 118. For instance, a peak statistic value of the target statistic set 116 is compared to a global mean value of that same statistic from the historical statistic set 118. If the peak statistic value exceeds the global mean value, the peak statistic value is considered to have passed the threshold and additional analysis is used to determine whether the peak statistic value should be considered a peak result 122. Alternatively, if the peak statistic value does not exceed the global mean value, the peak statistic value is considered to not have passed the threshold, such that the peak statistic value is very likely to be a false positive peak. Such a false positive peak is then eliminated from further analysis by the statistical analysis engine 120.

Analysis of the target statistic set 116 to identify peak results 122 therein may further include comparing peak statistic values of the set 116 to global peak statistic values of the set 118, comparing ratios of statistic values of the set 116 to defined threshold values, comparing statistic values of the set 116 to standard deviations of statistics in the set 116 and/or the historical statistic set 118, or the like. The analysis performed by the statistical analysis engine 120 includes the use or application of defined thresholds and/or weighting values. Such thresholds and/or weighting values are defined and/or tuned to enhance the performance and/or accuracy of the analysis. For instance, a mean event count value in the set 116 is compared to the product of a global max mean event count value of the set 118 and a defined weighting value. In such examples, if the mean event count value of the set 116 exceeds the product, the mean event count value is considered a peak result. The weighting value of the product is defined, tuned, and/or adjusted to improve the accuracy of the analysis (e.g., the weighting value may be increased to reduce the occurrence of false positive peak results or decreased to reduce the occurrence of real peak results failing to be identified). Examples of thresholds and weighting values that may be used during the analysis process are described in greater detail below. In other examples, more, fewer, or different types of statistical analysis may be used without departing from the description.

In some examples, the peak results 122 identified by the statistical analysis engine 120 include an indicator or other data associated with peak statistics in the target statistic set 116. A peak result 122 indicates that a particular peak statistic value is considered a true or valid peak associated with the data of the composite time series 110 and based on the analysis performed by the statistical analysis engine 120. Further, the target statistic set 116 includes statistics associated with each individual time series 112 of the composite time series 110 and peak results 122 identified by the statistical analysis engine 120 may include peak results 122 associated with data of specific individual time series 112 of the composite time series 110 (e.g., a composite time series includes an individual time series A and an individual time series B and a peak result is identified in statistic data specifically associated with the individual time series A). A valid peak is identified based on outlier data values that are likely to be associated with a malware campaign as described herein. Example peak results 122 includes peak statistic data values, such as event count data values, mean event count data values during the peak, maximum event count data values during the peak, or the like. Further, example peak results 122 include time data, such as a timestamp and/or time range, during which the peak result 122 occurred. Additional information of peak results 122 may include identifiers of computing systems or devices upon which events associated with the peak results 122 occurred, applications or processes of those systems that may be associated with events of the peak results 122, or the like.

In some examples, as the peak results 122 are identified by the statistical analysis engine 120, the peak results 122 are sent or provided to the malware campaign notification generator 124, which is configured to generate malware campaign notifications 126 based thereon. The malware campaign notification generator 124 uses the data of the peak results 122, including time data and/or source data (e.g., data identifying devices or systems upon which the malware campaign is likely to have occurred), to generate malware campaign notification 126 that indicate processes, applications, or files which may be the source of the malware campaign and/or indicate when the malware campaign occurred. The malware campaign notifications 126 may further be sent or otherwise provided to devices, systems, users, or other entities that are enabled to start an investigation, take action to stop the malware campaign (e.g., suspend operations of the associated process), and/or prevent the occurrence of future malware campaigns and/or associated events. For instance, a user that oversees maintaining a system upon which a malware campaign was detected is notified with information about the malware campaign, such that they are enabled to remove the offending software and/or files from the system. In another example, a malware removal application or process on a computing device is notified that a malware campaign was detected on the computing device, enabling the malware removal device to automatically act to remove the offending files and/or programs, suspend or block operations of the process, or otherwise act to prevent current and/or future campaigns from the process. Other types of malware campaign notifications are sent to other entities without departing from the description herein.

In some examples, the malware campaign detection platform is configured to use sliding or rolling time windows (as described in greater detail below with respect to FIG. 3). The detection analysis performed by the malware campaign detection platform 102 may be executed on a regular basis (e.g., as frequently as dictated by the time length of the target time window of the target statistic set 116). In some examples, the time length of the target time window is one day, such that the malware campaign detection platform 102 is configured to analyze telemetry data 104 of a composite time series 110 once per day, wherein each composite time series 110 includes the associated attribute data from a single day (e.g., the immediately previous day).

Further, in some examples, the telemetry data 104 includes duplicate data (e.g., instances of an attribute in an individual time series that have been recorded on multiple computing systems of the network being monitored). In such examples, the malware campaign detection platform 102 is configured to identify such duplicate data in the telemetry data 104 and to account for the duplicate data when generating the composite time series 110 and/or when generating the target statistic set 116. Accounting for duplicate data includes ignoring more than one instance of the data such that the associated event is only present in the time series 110 and/or the target statistic set 116 once. Alternatively, or additionally, accounting for duplicate data includes leaving the duplicate instances of the data in, such that the composite time series 110 and/or the target statistic set 116 reflect the duplicate data. Such duplicate data may be indicative of the spread of influence of a malware campaign through a complex computing system and, as such, it is useful in identifying peaks that correspond to malware campaigns as described herein.

FIG. 2 is a diagram 200 illustrating analysis of time series data in a target time window 230 and a historical time window 228 according to an embodiment. In some examples, elements of FIG. 2 are part of a system such as system 100 of FIG. 1 (e.g., the statistical analysis engine 220 is part of a malware campaign detection platform 102). The diagram 200 includes an illustration of a time series of data that is divided into a target time window 230 and a historical time window 228. In some examples, the time series of data includes a composite time series such as time series 110 of FIG. 1. The target time window 230 includes time series data that is used to generate a target statistic set 216 as described herein. The historical time window 228 includes time series data associated with the historical statistic set 218. As described above with respect to the statistical analysis engine 220, the target statistic set 216 and the historical statistic set 218 are used by the statistical analysis engine 220 to identify peak results 222 in the target statistic set 216.

In some examples, the target time window 230 includes data from a more recent time than the historical time window 228. Further, the latest time boundary of the historical time window 228 is configured to coincide with the earliest time boundary of the target time window 230, such that no data entries are between the target time window 230 and the historical time window 228 on the timeline. Further, in some examples, the target time window 230 is defined based on a determined length of time (e.g., six hours, twelve hours, one day) and the historical time window 228 is defined based on a combination of a plurality of previous target time windows (e.g., if the target time window length is one day, the historical time window length is defined as 90 days, the range of time being the 90 days immediately prior to the day associated with the current target time window 230).

Figure 3:
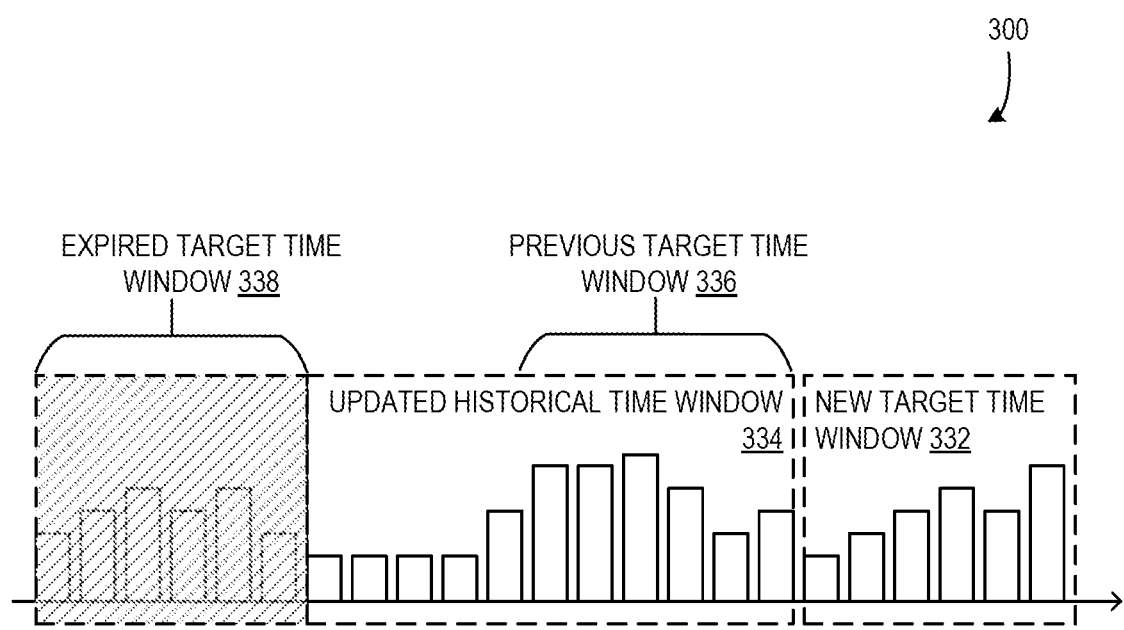
FIG. 3 is a diagram illustrating a process of adjusting target and historical time windows dynamically.

FIG. 3 is a diagram 300 illustrating a process of adjusting target and historical time windows dynamically according to an embodiment. In some examples, the illustrated time windows are associated with target and historical statistic sets (e.g., target statistic set 116 and historical statistic set 118) of a malware campaign detection system as described above with respect to FIGS. 1 and 2. For instance, the new target time window 332 is associated with a target statistic set and the updated historical time window 334 is associated with a historical statistic set. Further, the diagram 300 may reflect or describe a state of the associated statistic sets that occurs after the state illustrated in diagram 200 of FIG. 2. After a target statistic set is processed by the system, the statistic set and/or the associated time series data is combined into the historical statistic set. As a result, the target time window (e.g., target time window 230) with which the target statistic set is associated becomes a previous target time window 336 and is absorbed or otherwise combined with the historical time window (e.g., historical time window 228) of the historical statistic set to form the updated historical time window 334. When a new target statistic set is generated, it is associated with a new target time window 332 that occupies a time interval that is more recent than the updated historical time window 334. Further, the expired target time window 338 of the historical time window is removed from the historical time window when updating it into the updated historical time window 334, such that the historical time window with which the historical statistic set is associated covers a consistent length of time that is kept up to date dynamically, in some examples. The combination of a previous target time window 336 with the historical time window and/or the removal of the expired target time window 338 from the historical time window to form the updated historical time window 334 may include calculating updated statistic data values for the associated historical statistic set, such that the statistic data values of the historical statistic set reflect the time series data within the updated historical time window 334.

In some examples, statistical variables from the historical statistic set associated with the historical time window are used to set one or more thresholds during the analysis process to avoid identification of false positive peaks. As a result of the time windows rolling or sliding forward dynamically, these thresholds are dynamic, meaning that they will be adaptive against changes in future telemetry data. This is critical to maintaining the accuracy of the malware campaign detection platform over time. For instance, in a case where the amount of telemetry data suddenly increases due to an increased number of sensors being deployed, the statistical values shown in the target statistic set are likely to increase as well. However, the increased statistical values in the target set do not necessarily translate into valid or true peaks. To suppress the false positives, an adaptive thresholding approach is needed. The described approach of rolling or sliding the time windows forward results in the historical statistic set being updated with new data and, as a result, the associated threshold dynamically changing to fit the new state with the increased telemetry data. Using such adaptive, dynamic thresholds can also reduce false negative rates when the amount of telemetry data decreases due to a decrease in number of active sensors or the like.

Further, many of the statistic values in the historical statistic set associated with the updated historical time window may not need to be fully recalculated, but rather updated to include the statistic data associated with the previous target time window. For instance, a historical mean of an event count per target time window is updated by adding the event count mean value of the previous target time window to the product of the current historical mean and the total quantity of target time windows in the historical time window, subtracting the event count mean value associated with the expired target time window, and dividing the result by the total quantity of target time windows in the historical time window.

Figure 4:
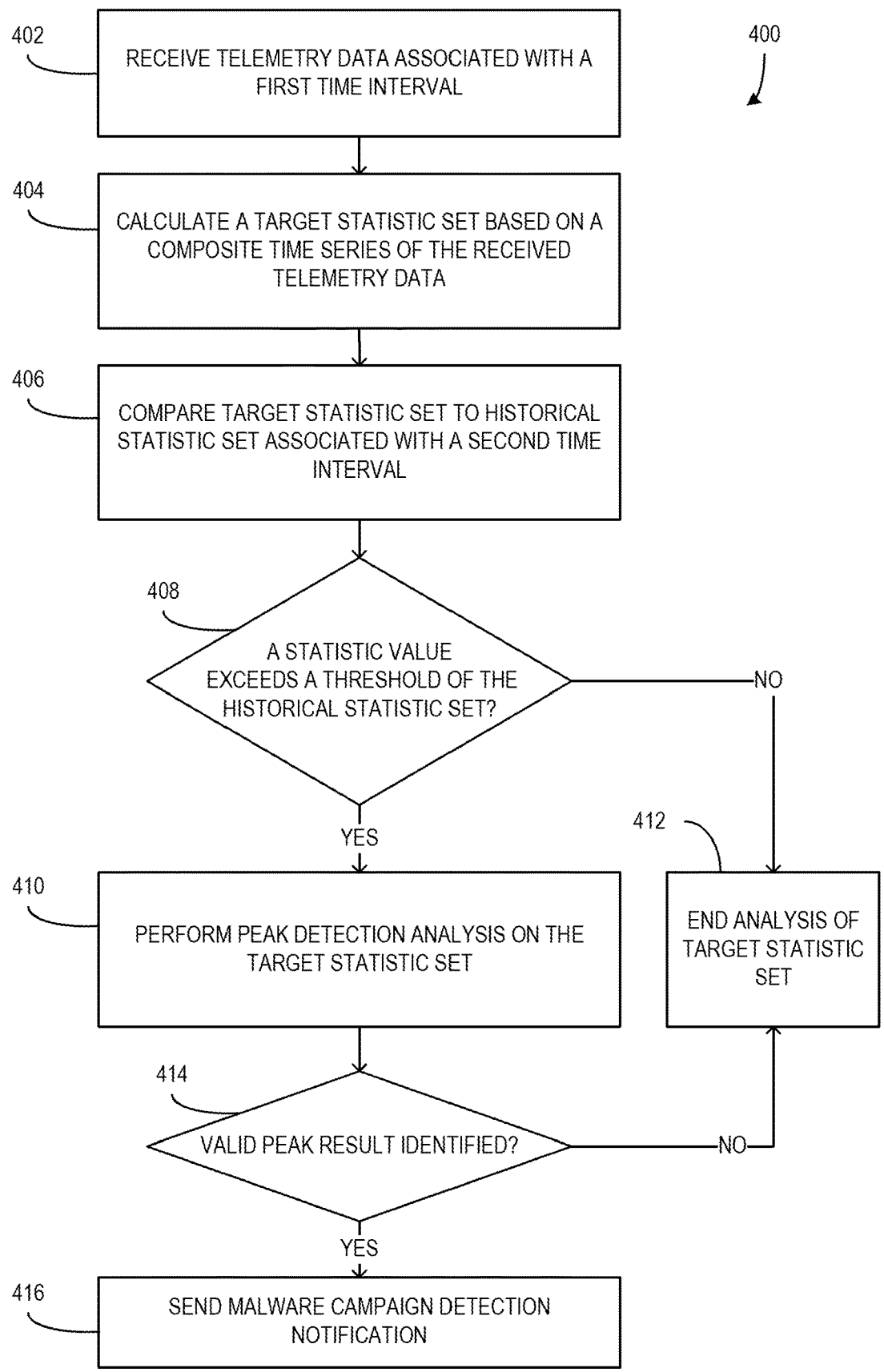
FIG. 4 is a flowchart illustrating a process for providing malware campaign detection notifications based on detected peaks in telemetry data.

FIG. 4 is a flowchart illustrating a process 400 for providing malware campaign detection notifications based on detected peaks in telemetry data according to an embodiment. In some examples, the process 400 is performed or otherwise executed on a system, such as the malware campaign detection platform 102 of system 100 as described above with respect to FIG. 1. At 402, telemetry data associated with a first time interval (e.g., a target time window 230) is received. In some examples, the received telemetry data includes data associated with attributes of the operation of a computing device and/or network of computing devices. The telemetry data may be configured to include those attributes based on the attributes, alone or in combination with each other, being indicative of the occurrence of a malware campaign in some manner. For instance, the telemetry data includes data associated with detected events associated with one or more file types and/or data associated with file hashes of specific files being accessed on the computing device(s) or computing system in general.

At 404, statistic data of a target statistic set is calculated based on a composite time series of the received telemetry data. In some examples, the received telemetry data includes the composite time series of data. Alternatively, in other examples, the composite time series is generated from the telemetry data. For instance, the telemetry data is converted into a plurality of individual time series of data, wherein each individual time series of the plurality of individual time series is based on a subset of attributes of a plurality of attributes that are indicative of an occurrence of a malware campaign. The plurality of individual time series of data are then combined into the composite time series of the received telemetry data. The target statistic set may be calculated to include statistics for each of the individual time series of the composite time series as described herein.

In some examples, the statistic data of the target statistic set includes data values indicative of quantities or count values of events or occurrences associated with attributes, mean values or other types of average values of such count values, data values indicative of statistical relationships between two or more attributes of the composite time series, data values indicative of standard deviations of data values in the composite time series, minimum values, maximum values, or the like. Other types of statistic data are calculated in other examples without departing from the description.

At 406, the target statistic set is compared to a historical statistic set that is associated with a second time interval (e.g., a historical time window 228). In some examples, the second time interval, which describes the time range of the attribute data described by the historical statistic set, is longer than and immediately precedes the first time interval of the target statistic set. For instance, the first time interval is one, two, or seven days while the second time interval is 60, 90, or 180 days. Other interval lengths may be used in other examples without departing from the description. Further, in some examples, the historical statistic set includes a plurality of past or previous target statistic sets (e.g., the statistic data of each past or previous target statistic set is included in the statistic data of the historical statistic set). In such examples, the historical statistic set further includes composite statistic data that is calculated based on analysis of all statistic data of the past or previous target statistic sets (e.g., composite mean or average values, composite minimum and/or maximum values, composite standard deviations, or the like). For instance, if the first time interval is one day and the second time interval is 60 days, the associated historical statistic set is configured to include 60 previous target statistic sets.

At 408, if a statistic value of the target statistic set exceeds a threshold based on the historical statistic set, the process proceeds to 410. Alternatively, if the statistic value of the target statistic set does not exceed the threshold, the process proceeds to 412. In some examples, the threshold is based on a defined composite statistic value or values from the historical statistic set (e.g., a composite mean value of attribute event counts over time or based on another attribute throughout the second time interval).

At 410, because the established threshold was exceeded at 408, peak detection analysis is performed on the target statistic set to identify whether the composite time series of data includes a valid peak result that is likely indicative of a malware campaign. Such peak detection analysis may include applying one or more other statistical thresholds and/or defined rules to the statistic data of the target statistic set. For instance, the analysis includes at least one of the following: analyzing mean value data associated with multiple attributes of the composite time series, analyzing standard deviation of data values associated with multiple attributes of the composite time series, and analyzing peak value data associated with multiple attributes of the composite time series. Other types of analysis may be performed on the target statistic set to identify valid peak results without departing from the description.

At 412, in cases where the defined threshold of the historical statistic set is not exceeded at 408 or a valid peak result is not identified at 414, the analysis of the target statistic set ends. In some examples, additional telemetry data is received (e.g., associated with a fourth time interval or a new target time window 332), and analysis of this new telemetry data begins after 412. This process is described in greater detail below with respect to FIG. 5.

At 414, if the peak detection analysis at 410 results in identification of a valid peak result, or multiple valid peak results, the process proceeds to 416. Alternatively, if the peak detection analysis does not result in the identification of a valid peak result, the process returns to 412.

At 416, a malware campaign detection notification is sent. In some examples, the malware campaign detection notification includes data identifying and/or otherwise indicating the identified valid peak result of the composite time series of the received telemetry data. Such data may include statistic data that was found to satisfy the requirements to be a valid peak result during the peak detection analysis. Additional data may include time data indicating a time frame in which the malware campaign is likely to have occurred and source data indicating a source computing device or devices upon which the malware campaign is likely to have occurred. Further data may include data indicative of applications or processes that are associated with the malware campaign.

In some examples, the malware campaign detection notification is sent to a responsible party (e.g., a user that manages the source computing system(s) or computing system configured to receive and/or process such notification) to enable that party to act to halt the malware campaign and/or prevent future related malware campaigns. Additionally, or alternatively, additional automatic action may be taken by the system based on identifying a valid peak result without departing from the description (e.g., the system may cause processes or applications associated with the malware campaign to cease operation or delete files associated with the malware campaign).

Further, in some examples, the process 400 may be performed based on different individual time series of the composite time series separately. Such performances may be done in parallel, in series, or in another arrangement without departing from the description herein. For instance, statistic data may be calculated based on each individual time series separately and, as a target statistic set of an individual time series is calculated, it may be analyzed as described with respect to 406-416. The process may then return to 404 to analyze the next available target statistic set of the next individual time series.

Figure 5:
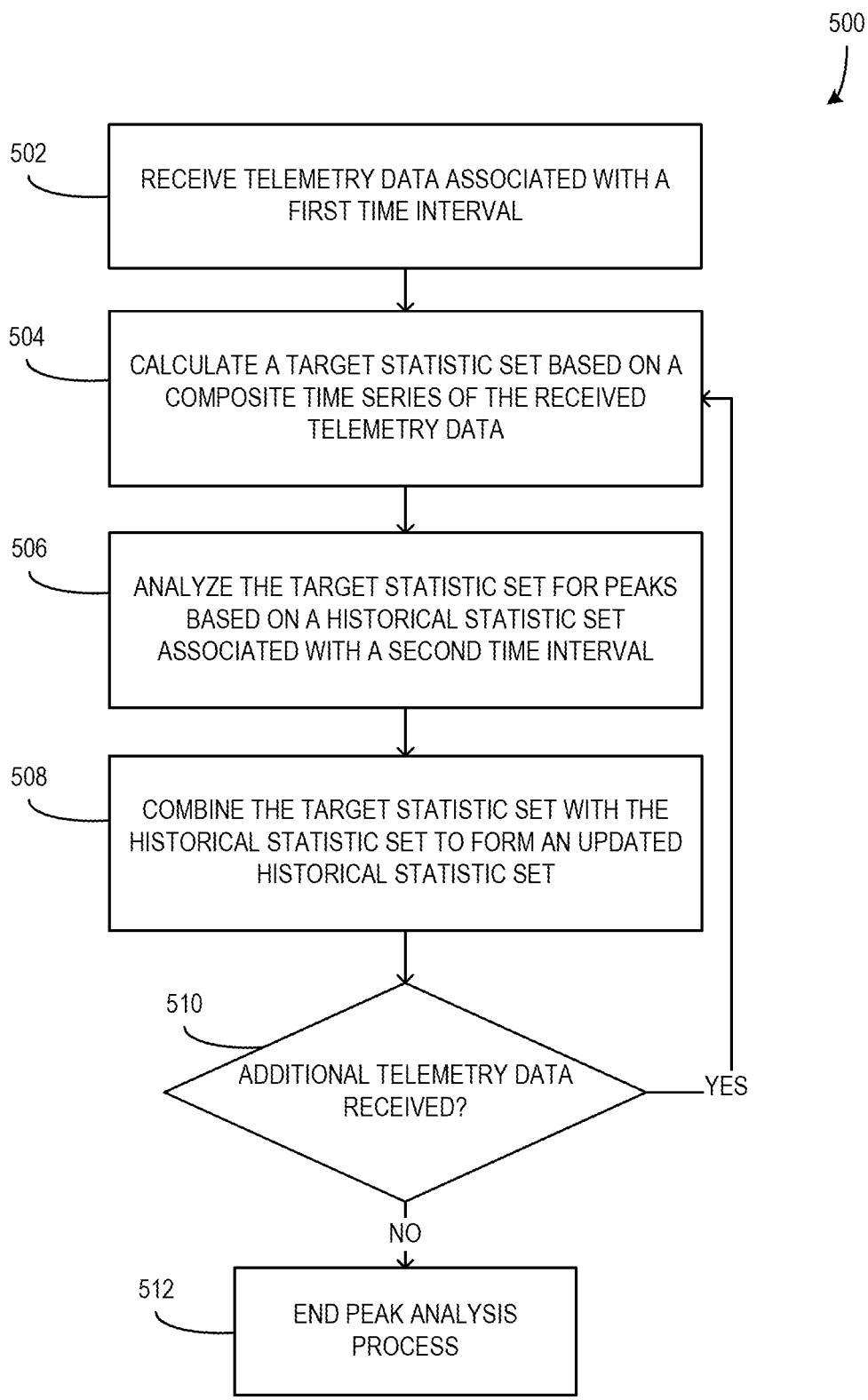
FIG. 5 is a flowchart illustrating a process for dynamically updating a historical statistic set.

FIG. 5 is a flowchart illustrating a process 500 for dynamically updating a historical statistic set according to an embodiment. In some examples, the process 500 is performed or otherwise executed on a system, such as the malware campaign detection platform 102 of system 100 as described above with respect to FIG. 1. At 502, telemetry data associated with a first time interval is received and, at 504, statistic data of a target statistic set is calculated based on a composite time series of the received telemetry data. The target statistic set is analyzed for peaks based, at least in part, on a historical statistic set associated with a second time interval. It should be understood that the process 500 at 502-506 may be configured to operate in substantially the same manner as the process 400 at 402-416 as described above.

At 508, the target statistic set is combined with the historical statistic set to form an updated historical statistic set. In some examples, the combining includes combining, by the processor, the target statistic set into the historical statistic set, wherein the second time interval is updated to include the first time interval, identifying, by the processor, a statistic subset of the historical statistic set, wherein the statistic subset is associated with a third time interval (e.g., an expired target time window 338), wherein the third time interval is equal in length to the first time interval and the third time interval includes an oldest subinterval of the second time interval, and removing, by the processor, the statistic subset from the historical statistic set, wherein the second time interval is updated to exclude the third time interval (e.g., the updated historical time window 334 is updated to include the previous target time window 336 and exclude the expired target time window 338 as described herein). The updating of the second time interval associated with the historical statistic set is described in greater detail with respect to FIG. 3.

At 510, if additional telemetry data is received, the process returns to 504, where a new target statistic set is calculated. Alternatively, if no additional telemetry data is received, the process proceeds to 512, at which point the peak analysis process ends. In some examples, the process 500 iterates or otherwise repeats over time, such that the historical statistic set is dynamically updated to reflect any changes to telemetry data trends over time, as described herein.

Figure 6:
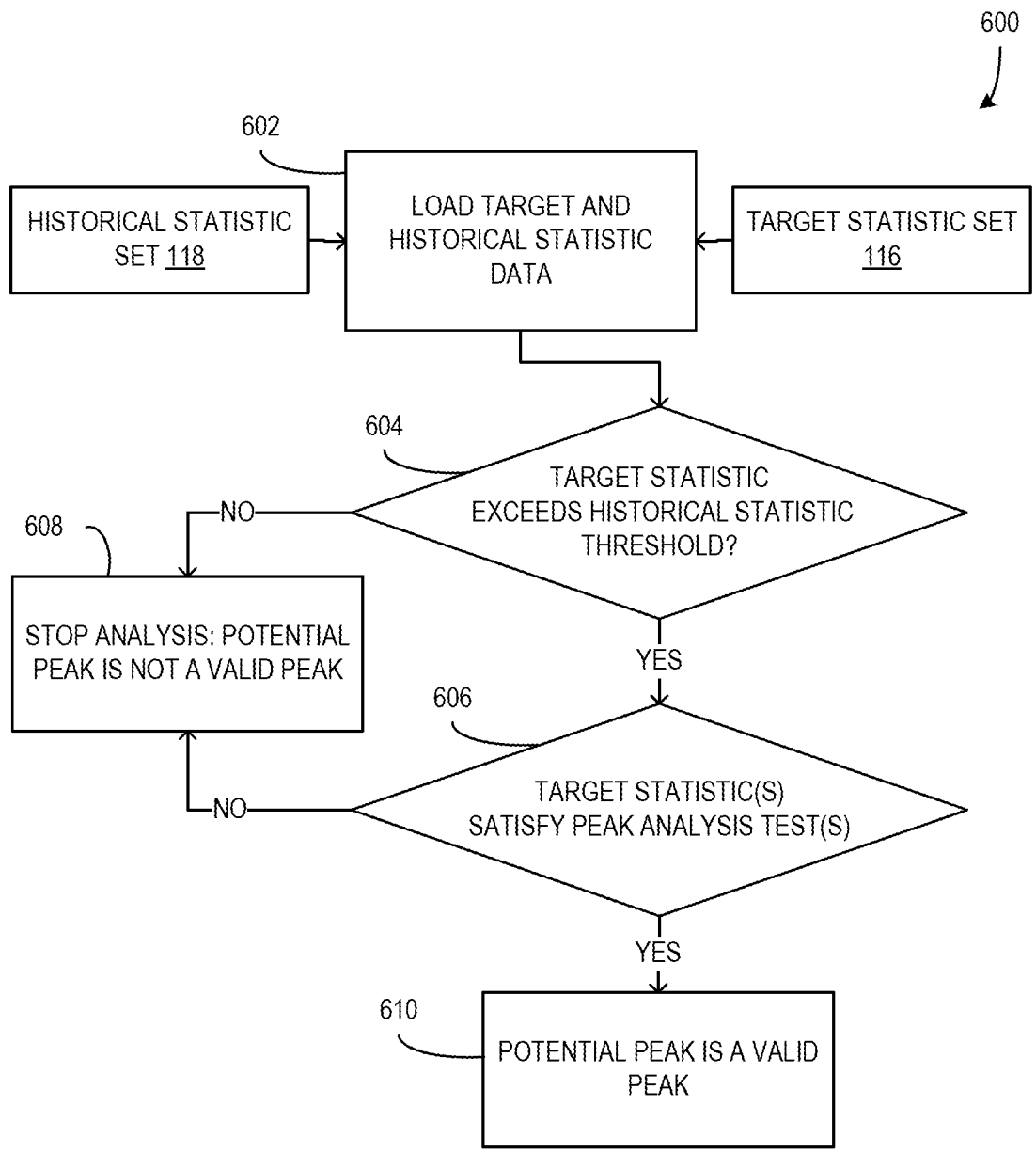
FIG. 6 is a flowchart illustrating a process for performing peak detection analysis on a target statistic set.

FIG. 6 is a flowchart illustrating a process 600 for performing peak detection analysis on a target statistic set according to an embodiment. In some examples, the process 600 is performed or otherwise executed on a system, such as the malware campaign detection platform 102 of system 100 as described above with respect to FIG. 1. At 602, the target statistic set 116 and the historical statistic set 118 are loaded for processing (e.g., into the statistical analysis engine 120 of FIG. 1). At 604, if a target statistic exceeds a historical statistic threshold, the process proceeds to 606. Alternatively, if the target statistic does not exceed the historical statistic threshold, the process proceeds to 608. In some examples, the target historical statistic threshold is defined to reflect an average value range, or a range of values that are normal or not outliers during operation of the associated computing system(s). Such a threshold may be adjusted by a weighting value to tune the threshold, such that the threshold accurately and efficiently eliminates potential peaks in the target statistic set 116 that are false positive peaks but that also allows valid peaks in the target statistic set 116 to be analyzed at 606.

At 606, target statistics of the target statistic set 116 are analyzed via one or more peak analysis tests, which may include application of additional thresholds or rules to the same target statistic or to other target statistics. Multiple tests may be applied to the target statistics and satisfying the tests may require passing one or more of the tests. In some examples, one test of a plurality of tests must be passed to satisfy the tests (e.g., the plurality of tests are performed and a logical OR operator is applied to the test results). Alternatively, or additionally, multiple tests may need to be passed to satisfy the tests (e.g., multiple tests are performed and a logical AND operator is applied to the test results). In other examples, other combinations of tests are applied to the target statistics without departing from the description. An example of a set of multiple tests that may be applied is described below with respect to FIG. 7.

If, at 606, the target statistics satisfy the peak analysis tests, the process proceeds to 610, indicating that a potential peak associated with the target statistic set is a valid peak. Alternatively, if the target statistics do not satisfy the peak analysis test, the process returns to 608.

At 608, the analysis of the target statistic set is stopped. The potential peak or peaks in the target set are found to not be valid peaks.

Figure 7:
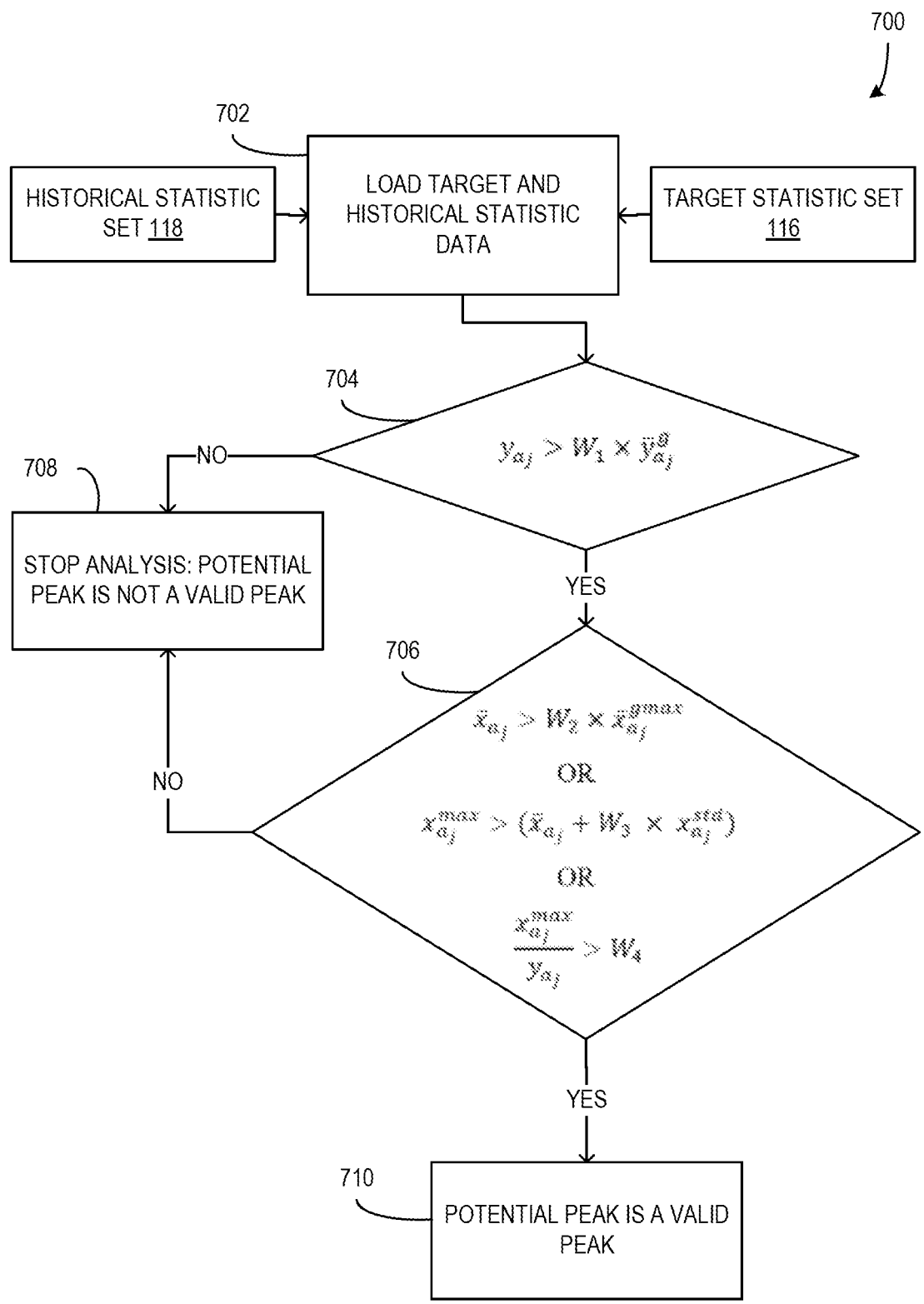
FIG. 7 is a flowchart illustrating an exemplary process for performing peak detection analysis on statistic values of a target statistic set.

FIG. 7 is a flowchart illustrating an exemplary process 700 for performing peak detection analysis on statistic values of a target statistic set according to an embodiment. In some examples, the process 700 is performed or otherwise executed on a system, such as the malware campaign detection platform 102 of system 100 as described above with respect to FIG. 1. Further, it should be understood that, in some examples, the process 700 is performed or executed in substantially the same manner as the process 600 of FIG. 6 described above. Process 700 includes specific examples of statistics that are used during the peak analysis process, but, in other examples, other statistics, thresholds, weighting values, and/or rules are used without departing from the description.

In some examples, the target statistic set 116, as loaded to be processed at 702, includes statistics associated with attributes of a composite time series of data. Such a composite time series can be described as follows: let e be an individual time series; then, the composite time series, s, can be defined as:

$$s = e_1 + e_2 + \ldots + e_j$$

where $e_j = [e_j(t_1), e_j(t_1), \ldots, e_j(t_M)]^T$ is the $j^{th}$ individual time series of events, with $j=[1, 2, \ldots, J]$; and $e_j(t_m)$ refers to the event at timestamp $t_m$ with $m=[1, 2, \ldots, M]$. Further, $[\ldots]^T$ denotes the transpose operation.

For a given data window in s, let y denote the number of all events in the window. In an example, a valid peak is associated with only two attributes (e.g., a file type attribute and a file hash attribute): attribute $a_j$ identifies an individual time series $e_j$, and attribute $b_k$ identifies the associated events in $e_j$, with $j=1, \ldots, J$ and $k=1, \ldots, K$ referring to the event instances. For example, if s contains three individual time series associated with portable document format (PDF) files, portable executable (PE) files, and MICROSOFT Excel files, then J=3. Thus, y can be expressed mathematically as:

$$y = \sum_{j=1}^{J} \sum_{k=1}^{K} x_{a_j b_k}$$

where x denotes the number of events for a given instance determined by the attributes $a_j$ and $b_k$. For instance, x may translate to the number of detections for a given file identified by its file hash (as $b_k$) and file type (as $a_j$). J may vary in different data windows and the same applies to K as j changes. This is because the number of individual time series (e.g., the number of file types) forming the composite series is not necessarily the same over time and, for a given individual time series, the number of instances over time can vary as well.

In the example illustrated by FIG. 7, statistic data in the target statistic set 116 includes the following statistic values:
$a_j$: an instance of attribute a
$y_{a_j}$: a total event count of attribute b
$\overline{x}_{a_j}$: a mean of event count per attribute b
$x_{a_j}^{std}$: a standard deviation of event count per attribute b
$x_{a_j}^{max}$: an event count of the most prevalent b instance Further, statistic data in the historical statistic set 118 includes the following statistic values:
$a_j$: an instance of attribute a
$ts_s$: start of the historical time window or interval
$ts_e$: end of the historical time window or interval
$c_v$: valid count of target statistic sets (and associated target time window or interval) processed
$\overline{y}_{a_j}^{g}$: global mean of event count per target time window
$\overline{x}_{a_j}^{gmax}$: global maximum mean of event count per attribute b
$y_{a_j}^{g}: [y_{a_j}^{1}, \ldots, y_{a_j}^{N_g}]$, where $N_g$ is the number of target time window lengths in the historical time window The statistics in the target statistic set are based on data from the target time window associated therewith, which is a one-day window in this example. The statistics in the historical statistic set stores the statistic data over the defined historical time window, which is $N_g$ times the length of the target time window. In this example, the historical time window is 180 days long, so $N_g=180$. It should be understood that $c_v$ is used to track the actual number of target time windows containing events associated with the attribute $a_j$, because some of the target time windows may not contain such events.

At 704, $y_{a_j}$, the total event count of attribute b, is compared to $\overline{y}_{a_j}^{g}$, the global mean of event count per target time window, multiplied by $W_1$, a weighting factor that is used to adjust or tune the threshold. If $y_{a_j} > W_1 \times \overline{y}_{a_j}^{g}$, the process proceeds to 706 to be analyzed by peak analysis tests. Alternatively, $y_{a_j} \leq W_1 \times \overline{y}_{a_j}^{g}$, the process proceeds to 708, where the analysis ends. The process 700 includes several weighting factors $W_l$, where $l=[1, 2, 3, 4]$. In some examples, the weighting factors are set experimentally to meet the requirements of application. Alternatively, or additionally, weighting factors may be trained or tuned by, for instance, using machine learning techniques and sets of historical attribute data and previously identified peak data.

At 706, statistics of the target statistic set are analyzed via peak analysis tests. The peak analysis tests include $\overline{x}_{a_j} > W_2 \times \overline{x}_{a_j}^{gmax}$, or comparing the average event count per attribute b in the target set to a threshold based on the global maximum mean of event count per attribute b multiplied by a weighting factor $W_2$; $x_{a_j}^{max} > (\overline{x}_{a_j} + W_3 \times x_{a_j}^{std})$, or comparing the event count of the most prevalent b instance in the target set to a threshold based on the mean value of the event count per attribute b combined with the standard deviation multiplied by a weighting factor $W_3$; and $$\frac{x_{a_j}^{max}}{y_{a_j}} > W_4,$$

or comparing a ratio of the event count of the most prevalent b instance to the a total event count of attribute b to a threshold defined by a weighting factor $W_4$. In this example, if the statistic values of the target set exceed any one of these threshold tests, the associated data is determined to be a valid peak and the process proceeds to 710. Alternatively, if none of the described threshold tests are exceeded, the associated data is determined to not include a valid peak, and the process returns to 708. It should be understood that, in other examples, different threshold tests may be used and/or combined in different ways to identify valid peaks in data without departing from the description.

Exemplary Operating Environment

Figure 8:
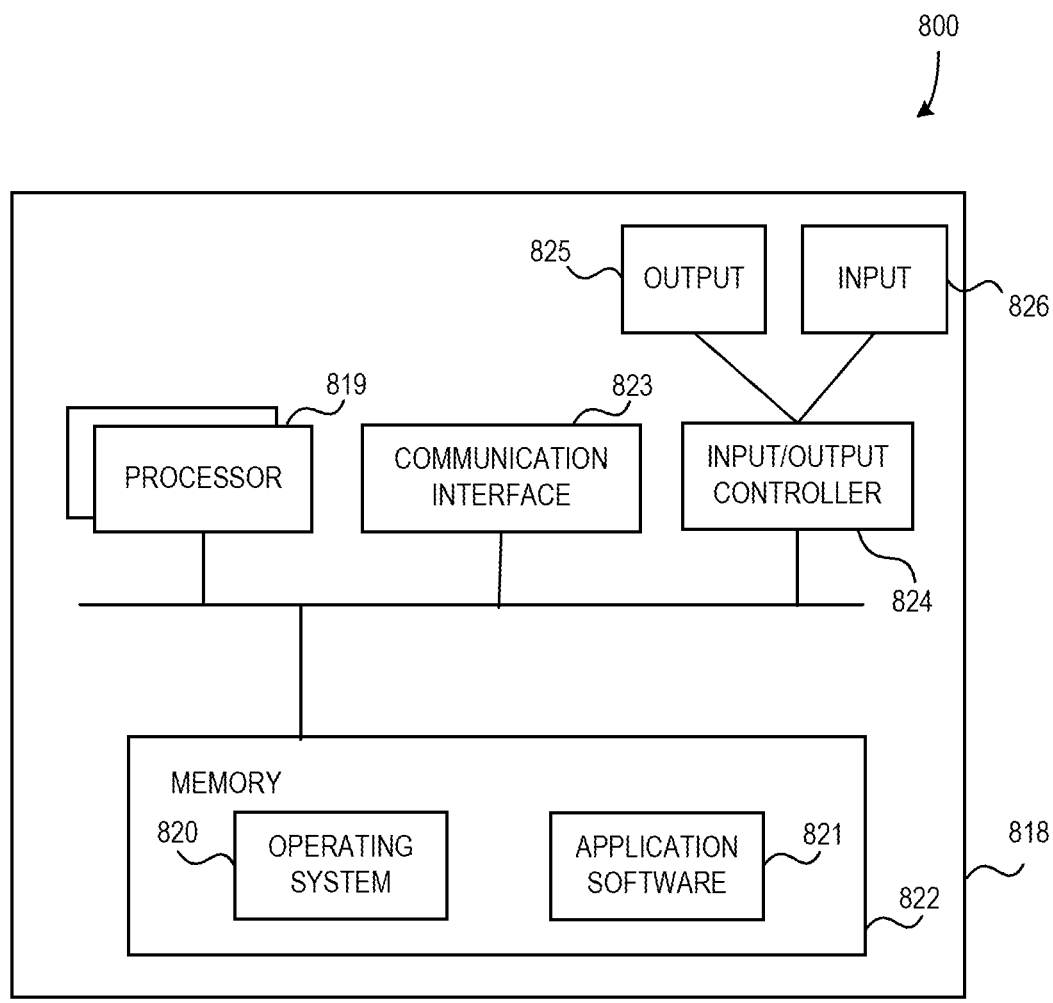
FIG. 8 illustrates a computing apparatus as a functional block diagram.

The present disclosure is operable with a computing apparatus according to an embodiment as a functional block diagram 800 in FIG. 8. In an embodiment, components of a computing apparatus 818 may be implemented as a part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hard-coded machine. Platform software comprising an operating system 820 or any other suitable platform software may be provided on the apparatus 818 to enable application software 821 to be executed on the device. According to an embodiment, identifying malware campaigns based on composite time series of telemetry data and associated historical statistics as described herein may be accomplished by software, hardware, and/or firmware.

Computer executable instructions may be provided using any computer-readable media that are accessible by the computing apparatus 818. Computer-readable media may include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g., using a communication interface 823).

The computing apparatus 818 may comprise an input/output controller 824 configured to output information to one or more output devices 825, for example a display or a speaker, which may be separate from or integral to the electronic device. The input/output controller 824 may also be configured to receive and process an input from one or more input devices 826, for example, a keyboard, a microphone, or a touchpad. In one embodiment, the output device 825 may also act as the input device. An example of such a device may be a touch sensitive display. The input/output controller 824 may also output data to devices other than the output device, e.g., a locally connected printing device. In some embodiments, a user may provide input to the input device(s) 826 and/or receive output from the output device(s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system for providing malware campaign detection notifications based on detected peaks in telemetry data comprises: a processor; and a non-transitory computer readable medium having stored thereon program code for transferring data to another computer system, the program code causing the processor to: receive telemetry data associated with malware campaign detection, wherein the telemetry data includes data entries associated with a first time interval; calculate a target statistic set based on a composite time series of the received telemetry data, wherein the composite time series includes a plurality of individual time series, wherein each individual time series is based on multiple attributes of the telemetry data; compare the target statistic set to a historical statistic set, wherein the historical statistic set is based on a second time interval that is a greater length than the first time interval and the second time interval precedes the first time interval; based on comparison of the target statistic set to the historical statistic set indicating that a statistic value associated with a potential data peak of the target statistic set exceeds a statistic threshold of the historical statistic set, perform peak detection analysis on the potential data peak of the target statistic set; and based on the peak detection analysis indicating that the potential data peak is a valid peak result in the received telemetry data, send a notification of detection of a malware campaign, wherein the notification includes data indicative of the valid peak result and enables a receiver of the notification to take corrective action.

An example method for providing malware campaign detection notifications based on detected peaks in telemetry data comprises: receiving, by a processor, telemetry data associated with malware campaign detection, wherein the telemetry data includes data entries associated with a first time interval; calculating, by the processor, a target statistic set based on a composite time series of the received telemetry data, wherein the composite time series includes a plurality of individual time series, wherein each individual time series is based on multiple attributes of the telemetry data; comparing, by the processor, the target statistic set to a historical statistic set, wherein the historical statistic set is based on a second time interval that is a greater length than the first time interval and the second time interval precedes the first time interval; based on comparison of the target statistic set to the historical statistic set indicating that a statistic value associated with a potential data peak of the target statistic set exceeds a statistic threshold of the historical statistic set, performing, by the processor, peak detection analysis on the potential data peak of the target statistic set; and based on the peak detection analysis indicating that the potential data peak is a valid peak result in the received telemetry data, sending, by the processor, a notification of detection of a malware campaign, wherein the notification includes data indicative of the valid peak result and enables a receiver of the notification to take corrective action.

A non-transitory computer storage medium stores program code executable by a first computer system at a first site, the program code embodying a method that comprises: receiving telemetry data associated with malware campaign detection, wherein the telemetry data includes data entries associated with a first time interval; calculating a target statistic set based on a composite time series of the received telemetry data, wherein the composite time series includes a plurality of individual time series, wherein each individual time series is based on multiple attributes of the telemetry data; comparing the target statistic set to a historical statistic set, wherein the historical statistic set is based on a second time interval that is a greater length than the first time interval and the second time interval precedes the first time interval; based on comparison of the target statistic set to the historical statistic set indicating that a statistic value associated with a potential data peak of the target statistic set exceeds a statistic threshold of the historical statistic set, performing peak detection analysis on the potential data peak of the target statistic set; and based on the peak detection analysis indicating that the potential data peak is a valid peak result in the received telemetry data, sending a notification of detection of a malware campaign, wherein the notification includes data indicative of the valid peak result and enables a receiver of the notification to take corrective action.

Alternatively, or in addition to the other examples described herein, examples include any combination of the following:

further comprising: converting, by the processor, the telemetry data into the plurality of individual time series of data, wherein each individual time series of the plurality of individual time series is based on a subset of attributes of a plurality of attributes that are indicative of an occurrence of at least one malware campaign; and combining, by the processor, the plurality of individual time series of data into the composite time series of the received telemetry data.

further comprising: based on completing analysis of the target statistic set, updating the historical statistic set, wherein updating the historical statistic set includes: combining, by the processor, the target statistic set into the historical statistic set, wherein the second time interval is updated to include the first time interval; identifying, by the processor, an statistic subset of the historical statistic set, wherein the statistic subset is associated with a third time interval, wherein the third time interval is equal in length to the first time interval and the third time interval includes an oldest subinterval of the second time interval; and removing, by the processor, the statistic subset from the historical statistic set, wherein the second time interval is updated to exclude the third time interval.

further comprising: receiving, by the processor, new telemetry data, wherein the new telemetry data includes data entries associated with a fourth time interval, wherein the fourth time interval succeeds the updated second time interval of the updated historical statistic set; calculating, by the processor, a new target statistic set based on a new composite time series of the received new telemetry data; comparing, by the processor, the new target statistic set to the updated historical statistic set; based on comparison of the new target statistic set to the updated historical statistic set indicating that a new statistic value associated with a new potential data peak of the new target statistic set exceeds a statistic threshold of the updated historical statistic set, performing, by the processor, peak detection analysis on the new potential data peak of the new target statistic set; and based on the peak detection analysis indicating that the new potential data peak is a valid peak result in the received new telemetry data, sending, by the processor, a new notification of detection of a malware campaign, wherein the new notification includes data indicative of the valid peak result and enables a receiver of the notification to take corrective action.

wherein the statistic threshold of the historical statistic set includes a historical mean value of an event count of a first attribute per event instance of a second attribute over the second time interval and the statistic value includes a value of an event count of the first attribute per event instance of the second attribute over the first time interval.

wherein performing peak detection analysis on the potential data peak of the target statistic set includes at least one of the following: analyzing mean value data associated with multiple attributes of the composite time series, analyzing standard deviation of data values associated with multiple attributes of the composite time series, and analyzing peak value data associated with multiple attributes of the composite time series.

wherein the notification of detection enables a receiver of the notification to take corrective action.

wherein the composite time series includes attribute data associated with a file type attribute and attribute data associated with a file hash attribute.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute exemplary means for receiving, by a processor, telemetry data associated with malware campaign detection, wherein the telemetry data includes data entries associated with a first time interval; exemplary means for calculating, by the processor, a target statistic set based on a composite time series of the received telemetry data, wherein the composite time series includes a plurality of individual time series, wherein each individual time series is based on multiple attributes of the telemetry data; exemplary means for comparing, by the processor, the target statistic set to a historical statistic set, wherein the historical statistic set is based on a second time interval that is a greater length than the first time interval and the second time interval precedes the first time interval; based on comparison of the target statistic set to the historical statistic set indicating that a statistic value associated with a potential data peak of the target statistic set exceeds a statistic threshold of the historical statistic set, exemplary means for performing, by the processor, peak detection analysis on the potential data peak of the target statistic set; and based on the peak detection analysis indicating that the potential data peak is a valid peak result in the received telemetry data, exemplary means for sending, by the processor, a notification of detection of a malware campaign, wherein the notification includes data indicative of the valid peak result and enables a receiver of the notification to take corrective action.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for providing malware campaign detection notifications based on detected peaks in telemetry data, the method comprising:
    obtaining, by a processor, telemetry data associated with malware campaign detection, wherein the telemetry data includes data entries associated with a first time interval;
    calculating, by the processor, a target statistic set based on a composite time series of the obtained telemetry data, wherein the composite time series includes a plurality of individual time series, wherein each individual time series is based on multiple attributes of the telemetry data;
    comparing, by the processor, the target statistic set to a historical statistic set, wherein the historical statistic set is based on a second time interval that has a greater length than the first time interval and the second time interval precedes the first time interval;
    based on comparison of the target statistic set to the historical statistic set indicating that a statistic value of the target statistic set exceeds a statistic threshold of the historical statistic set, performing, by the processor, peak detection analysis on the target statistic set; and
    based on the peak detection analysis indicating that a valid peak result is in the obtained telemetry data, sending, by the processor, a notification of detection of a malware campaign, wherein the notification includes data indicative of the valid peak result.

2. The method of claim 1, further comprising:
    converting, by the processor, the telemetry data into the plurality of individual time series of data, wherein each individual time series of the plurality of individual time series is based on a subset of attributes of a plurality of attributes that are indicative of an occurrence of at least one malware campaign; and
    combining, by the processor, the plurality of individual time series of data into the composite time series of the obtained telemetry data.

3. The method of claim 1, further comprising:
    based on completing analysis of the target statistic set, updating the historical statistic set, wherein updating the historical statistic set includes:
        combining, by the processor, the target statistic set into the historical statistic set, wherein the second time interval is updated to include the first time interval;
        identifying, by the processor, an attribute statistic subset of the historical statistic set, wherein the attribute statistic subset is associated with a third time interval, wherein the third time interval is equal in length to the first time interval and the third time interval includes an oldest subinterval of the second time interval; and
        removing, by the processor, the attribute statistic subset from the historical statistic set, wherein the second time interval is updated to exclude the third time interval.

4. The method of claim 3, further comprising:
    obtaining, by the processor, new telemetry data, wherein the new telemetry data includes data entries associated with a fourth time interval, wherein the fourth time interval succeeds the updated second time interval of the updated historical statistic set;
    calculating, by the processor, a new target statistic set based on a new composite time series of the obtained new telemetry data;
    comparing, by the processor, the new target statistic set to the updated historical statistic set;
    based on comparison of the new target statistic set to the updated historical statistic set indicating that a new statistic value associated with the new target statistic set exceeds a statistic threshold of the updated historical statistic set, performing, by the processor, peak detection analysis on the new target statistic set; and
    based on the peak detection analysis indicating that a valid peak result is in the obtained new telemetry data, sending, by the processor, a new notification of detection of a malware campaign, wherein the new notification includes data indicative of the valid peak result and enables a receiver of the notification to take corrective action.

5. The method of claim 1, wherein the statistic threshold of the historical statistic set includes a historical mean value of an event count of a first attribute per event instance of a second attribute over the second time interval and the statistic value includes a value of an event count of the first attribute per event instance of the second attribute over the first time interval.

6. The method of claim 1, wherein performing peak detection analysis on the target statistic set includes at least one of the following: analyzing mean value data associated with multiple attributes of the composite time series, analyzing standard deviation of data values associated with multiple attributes of the composite time series, and analyzing peak value data associated with multiple attributes of the composite time series.

7. The method of claim 1, wherein the notification of detection enables a receiver of the notification to take corrective action.

8. A computer system for providing malware campaign detection notifications based on detected peaks in telemetry data, the computer system comprising:
    a processor; and
    a non-transitory computer readable medium having stored thereon program code for transferring data to another computer system, the program code causing the processor to:
    obtain telemetry data associated with malware campaign detection, wherein the telemetry data includes data entries associated with a first time interval;
    calculate a target statistic set based on a composite time series of the obtained telemetry data, wherein the composite time series includes a plurality of individual time series, wherein each individual time series is based on multiple attributes of the telemetry data;
    compare the target statistic set to a historical statistic set, wherein the historical statistic set is based on a second time interval that has a greater length than the first time interval and the second time interval precedes the first time interval;
    based on comparison of the target statistic set to the historical statistic set indicating that a statistic value associated with the target statistic set exceeds a statistic threshold of the historical statistic set, perform peak detection analysis on the target statistic set; and
    based on the peak detection analysis indicating that a valid peak result is in the obtained telemetry data, send a notification of detection of a malware campaign, wherein the notification includes data indicative of the valid peak result.

9. The computer system of claim 8, wherein the program code further causes the processor to:
convert the telemetry data into the plurality of individual time series of data, wherein each individual time series of the plurality of individual time series is based on a subset of attributes of a plurality of attributes that are indicative of an occurrence of at least one malware campaign; and
combine the plurality of individual time series of data into the composite time series of the obtained telemetry data.

10. The computer system of claim 8, wherein the program code further causes the processor to:
based on completing analysis of the target statistic set, update the historical statistic set, wherein updating the historical statistic set includes:
combining the target statistic set into the historical statistic set, wherein the second time interval is updated to include the first time interval;
identifying a statistic subset of the historical statistic set, wherein the statistic subset is associated with a third time interval, wherein the third time interval is equal in length to the first time interval and the third time interval includes an oldest subinterval of the second time interval; and
removing the statistic subset from the historical statistic set, wherein the second time interval is updated to exclude the third time interval.

11. The computer system of claim 10, wherein the program code further causes the processor to:
obtain new telemetry data, wherein the new telemetry data includes data entries associated with a fourth time interval, wherein the fourth time interval succeeds the updated second time interval of the updated historical statistic set;
calculate a new target statistic set based on a new composite time series of the obtained new telemetry data;
compare the new target statistic set to the updated historical statistic set;
based on comparison of the new target statistic set to the updated historical statistic set indicating that a new statistic value associated with the new target statistic set exceeds a statistic threshold of the updated historical statistic set, perform peak detection analysis on the new target statistic set; and
based on the peak detection analysis indicating that a valid peak result is in the obtained new telemetry data, send a new notification of detection of a malware campaign, wherein the new notification includes data indicative of the valid peak result and enables a receiver of the notification to take corrective action.

12. The computer system of claim 8, wherein the statistic threshold of the historical statistic set includes a historical mean value of an event count of a first attribute per event instance of a second attribute over the second time interval and the statistic value includes a value of an event count of the first attribute per event instance of the second attribute over the first time interval.

13. The computer system of claim 8, wherein performing peak detection analysis on the target statistic set includes at least one of the following: analyzing mean value data associated with multiple attributes of the composite time series, analyzing standard deviation of data values associated with multiple attributes of the composite time series, and analyzing peak value data associated with multiple attributes of the composite time series.

14. The computer system of claim 8, wherein the notification of detection enables a receiver of the notification to take corrective action.

15. A non-transitory computer storage medium having stored thereon program code executable by a first computer system at a first site, the program code embodying a method comprising:
obtaining telemetry data associated with malware campaign detection, wherein the telemetry data includes data entries associated with a first time interval;
calculating a target statistic set based on a composite time series of the obtained telemetry data, wherein the composite time series includes a plurality of individual time series, wherein each individual time series is based on multiple attributes of the telemetry data;
comparing the target statistic set to a historical statistic set, wherein the historical statistic set is based on a second time interval that has a greater length than the first time interval and the second time interval precedes the first time interval;
based on comparison of the target statistic set to the historical statistic set indicating that a statistic value associated with the target statistic set exceeds a statistic threshold of the historical statistic set, performing peak detection analysis on the target statistic set; and
based on the peak detection analysis indicating that a valid peak result is in the obtained telemetry data, sending a notification of detection of a malware campaign, wherein the notification includes data indicative of the valid peak result.

16. The non-transitory computer storage medium of claim 15, wherein the method embodied by the program code further comprises:
converting the telemetry data into the plurality of individual time series of data, wherein each individual time series of the plurality of individual time series is based on a subset of attributes of a plurality of attributes that are indicative of an occurrence of at least one malware campaign; and
combining the plurality of individual time series of data into the composite time series of the obtained telemetry data.

17. The non-transitory computer storage medium of claim 15, wherein the method embodied by the program code further comprises:
based on completing analysis of the target statistic set, updating the historical statistic set, wherein updating the historical statistic set includes:
combining the target statistic set into the historical statistic set, wherein the second time interval is updated to include the first time interval;
identifying an statistic subset of the historical statistic set, wherein the statistic subset is associated with a third time interval, wherein the third time interval is equal in length to the first time interval and the third time interval includes an oldest subinterval of the second time interval; and
removing the statistic subset from the historical statistic set, wherein the second time interval is updated to exclude the third time interval.

18. The non-transitory computer storage medium of claim 17, wherein the method embodied by the program code further comprises:
obtaining new telemetry data, wherein the new telemetry data includes data entries associated with a fourth time interval, wherein the fourth time interval succeeds the updated second time interval of the updated historical statistic set;

calculating a new target statistic set based on a new composite time series of the obtained new telemetry data;

comparing the new target statistic set to the updated historical statistic set;

based on comparison of the new target statistic set to the updated historical statistic set indicating that a new statistic value associated with the new target statistic set exceeds a statistic threshold of the updated historical statistic set, performing peak detection analysis on the new target statistic set; and based on the peak detection analysis indicating that a valid peak result is in the obtained new telemetry data, sending a new notification of detection of a malware campaign, wherein the new notification includes data indicative of the valid peak result and enables a receiver of the notification to take corrective action.

19. The non-transitory computer storage medium of claim 15, wherein the statistic threshold of the historical statistic set includes a historical mean value of an event count of a first attribute per event instance of a second attribute over the second time interval and the statistic value includes a value of an event count of the first attribute per event instance of the second attribute over the first time interval.

20. The non-transitory computer storage medium of claim 15, wherein performing peak detection analysis on the target statistic set includes at least one of the following: analyzing mean value data associated with multiple attributes of the composite time series, analyzing standard deviation of data values associated with multiple attributes of the composite time series, and analyzing peak value data associated with multiple attributes of the composite time series.

* * * * *